(12) United States Patent
Akazawa

(10) Patent No.: US 6,621,182 B2
(45) Date of Patent: Sep. 16, 2003

(54) ENTERTAINMENT DEVICE AND METHOD OF OPERATION THEREOF

(75) Inventor: Toru Akazawa, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 139 days.

(21) Appl. No.: 09/797,425

(22) Filed: Mar. 1, 2001

(65) Prior Publication Data

US 2002/0121812 A1 Sep. 5, 2002

(51) Int. Cl.$^7$ .................................................. H02J 4/00
(52) U.S. Cl. ........................................................ 307/140
(58) Field of Search ................................ 307/134, 139, 307/140, 141; 713/310

(56) References Cited

U.S. PATENT DOCUMENTS

| | | | |
|---|---|---|---|
| 4,202,038 A | | 5/1980 | Petersson |
| 4,695,739 A | | 9/1987 | Pierce |
| 4,890,006 A | * | 12/1989 | Huang ........................ 200/11 C |
| 5,140,178 A | | 8/1992 | Yoshihara et al. |
| 5,838,982 A | * | 11/1998 | Cooper et al. ............... 713/300 |
| 5,987,613 A | * | 11/1999 | Busch et al. ................. 713/300 |
| 6,119,225 A | * | 9/2000 | Kim ................................ 713/1 |
| 6,369,466 B1 | * | 4/2002 | Murphy ...................... 116/63 R |

FOREIGN PATENT DOCUMENTS

| | | | | |
|---|---|---|---|---|
| EP | 0 501 456 A2 | | 9/1992 | |
| JP | 11-184573 | * | 7/1999 | .............. G06F/1/26 |
| JP | 2001-84859 | * | 3/2001 | ............ H01H/9/54 |

OTHER PUBLICATIONS

Microsoft Computer Dictionary.—5th ed. Published by Microsoft Press, copyright 2002. See pp. 57 and 450.*

* cited by examiner

Primary Examiner—Gregory J. Toatley, Jr.
(74) Attorney, Agent, or Firm—Katten Muchin Zavis Rosenman

(57) ABSTRACT

An entertainment device and its operation method in which multiple operations are achieved by the same operation unit. The entertainment device has a main system that receives a supply of power from a power circuit, a push switch that receives operation instructions from outside, a system controller that receives signals from the push switch and controls the state of main system. An internal switch of the device decides whether to turn the power of main system on or off. When the power source of main system is turned on, the system controller decides, based on the state of signals received from the push switch within a first standard time, whether to output to internal switch a signal giving power off instruction, or whether to output to the main system a signal giving a reset instruction.

22 Claims, 6 Drawing Sheets

ENTERTAINMENT DEVICE AND METHOD
OF OPERATION THEREOF

FIELD OF THE INVENTION

This invention concerns an entertainment device and an operation method of the entertainment device, in which multiple kinds of operations, for example operations of power off and reset, are done in common with the operation part of the entertainment device.

BACKGROUND OF THE INVENTION

Heretofore in an entertainment device, if there are many individual operation parts, they each have charge of a single function, for example, turning the power on and off is done with a power switch, and the reset function is done with a reset switch, and the power switch and reset switch have been provided separately.

But in recent years, entertainment devices have been made increasingly smaller while being given more functions to perform. This has made it unavoidable to add operation units related to the new functions, despite the smaller surface area of the entertainment device main body. This has created a demand to reduce the operation units as much as possible even though main body of the entertainment device is made smaller and new functions have been added to the entertainment device.

SUMMARY OF THE INVENTION

Thus the object of this invention is to provide an entertainment device that accepts multiple kinds of operation instructions with the same operation unit, and an operation method of such entertainment device.

The above and other objects of the present invention are attained by an entertainment device comprising:
an operation unit that allows operations from outside and
a decision unit that decides, concerning operations accepted by said operation unit, the mode of operation of said operation, and
outputs predefined instruction signals with respect to said decided operation modes.

The entertainment device according to present invention comprises:
a main system,
an operation unit that allows operation instructions from outside,
a control unit that receives signals from said operation unit and controls an operation state of said main system, and
a switch that decides whether to turn the power supply to the system on or off based on instructions from said control unit, wherein
when power is being supplied to said main system,
said control unit decides,
based on the mode of a signal input by said operation unit, whether to output to said switch a signal instructing that the power supply be turned off, or whether to output to said main system a signal giving a reset instruction.

In an embodiment, the entertainment device of this invention comprises:
a main system,
a push switch that allows operation instructions from outside,
a control unit that receives signals conveyed from said push switch and controls an operation state of said main system, and
a power supply switch that decides whether to turn the power supply to the system on or off based on instructions from said control unit, wherein
when power is being supplied to said main system,
said control unit decides,
based on the mode of a signal conveyed from said push switch, whether to output to said power supply switch a signal instructing that the power supply be turned off, or whether to output to said main system a signal giving a reset instruction.

An operation method of an entertainment device according to this invention comprises the steps of: operating an operation unit of the entertainment device from outside;
deciding receiving signals from said operation unit and controlling by a control unit of the entertainment device an a operation state of a main system of the entertainment device and whether to turn power supply to said main system on or off by a switch of the entertainment system, based on instructions from said control unit, wherein
when power is being supplied to said main system by said switch being on,
based on a state of a signal input by said operation unit, it is decided whether to output to said switch a signal instructing that the power supply be turned off, or whether to output to said main system a signal giving a reset instruction.

In an embodiment, the operation method of an entertainment system having a push switch, a main system, a control unit and a power supply switch, the method comprising the steps of operating the push switch;
receiving signals conveyed from said push switch and controlling by the control unit an operation state of the main system;
and deciding whether to turn the power supply to said main system on or off is by the power supply switch based on instructions from said control unit, wherein
when power is being supplied to said main system by said power supply switch being on,
based on the state of signals conveyed by said push switch, it is decided whether to output to said power supply switch a signal instructing that the power supply be turned off, or whether to output to said main system a signal giving a reset instruction.

DETAILED DESCRIPTION OF THE PREFERRED EMBODIMENTS

In the following, using the drawings, the embodiments of this invention will be described. The explanation is given by taking as an example an entertainment device that is capable of games, video playback, audio playback, communication, etc.

Figure 1:
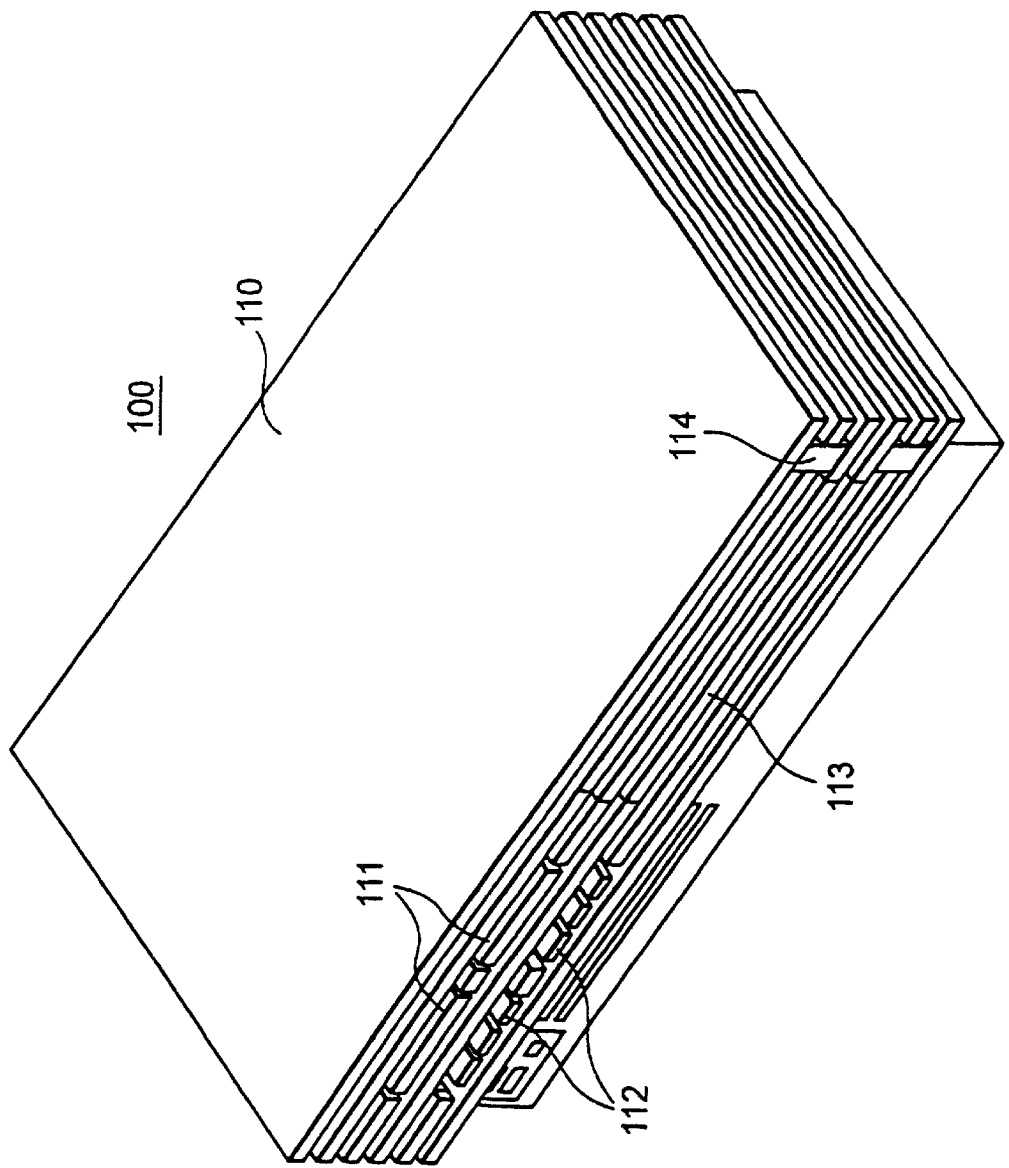
FIG. 1 is a perspective view of the entertainment device of the present invention.

FIG. 1 shows a perspective view of the entertainment device 100 of an embodiment. Entertainment device 100 is housed in a cabinet 110. Arranged on the front surface of cabinet 110 are memory card insertion holes 111, controller insertion holes 112, a retractable disk tray 113, and a push switch (hereafter also called simply "switch") 114. Here, the user of the entertainment device 100 can operate push switch 114 on the front surface of cabinet 110 as an operation to the operation reception means; specifically, he can perform a push-in operation on push switch 114.

In FIG. 1, push switch 114 is used as a means for receiving operation instructions from outside, but it is not limited to this. For example, the switch may be a touch switch or touch panel, etc.

Figure 2:
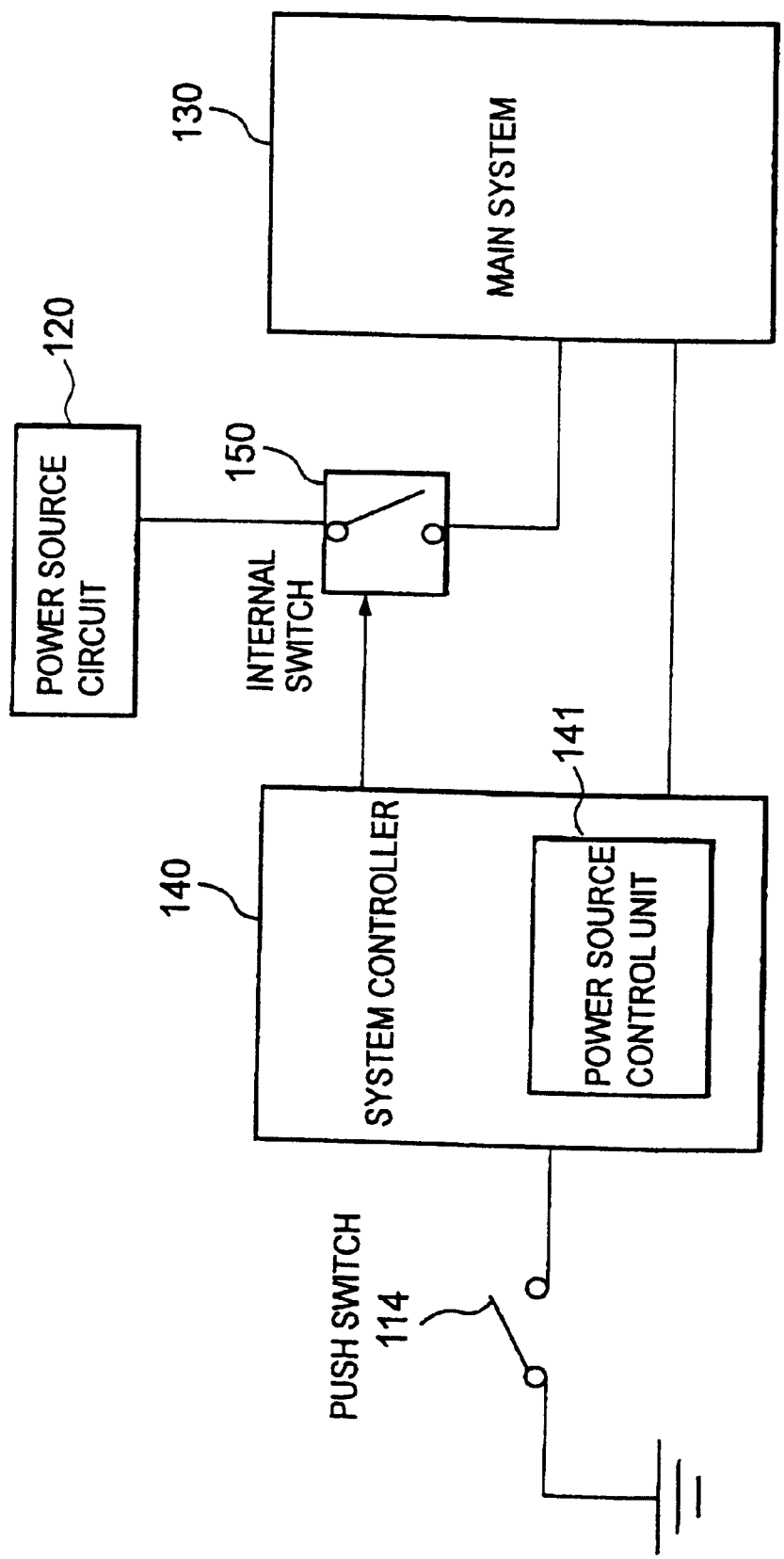
FIG. 2 is a block diagram of the entertainment device of the invention.

Referring to FIG. 2, the internal composition of entertainment device 100 shown in FIG. 1 will be now described.

FIG. 2 is a functional block diagram of entertainment device 100 of this embodiment. The example shown in FIG. 2 is one for describing an example in which push switch 114 is shared with a power switch and a reset switch.

Entertainment device 100 shown in FIG. 2 has at least a power circuit 120, a main system 130 that provides entertainment functions to the user, a push switch 114 that receives operation instructions from outside, a system controller 140 that controls the operation state of main system 130, and an internal switch 150 that decides whether to turn the power of main system 130 on or off.

System controller 140 has a power control unit 141 which performs power control of main system 130.

Push switch 114 is connected to system controller 140, and signals that indicate the operation state of push switch 114 are transmitted to system controller 140. That is, pushing grounded push switch 114 causes [the voltage of] the terminal (not shown) of system controller 140 that is connected to push switch 114 to go down to the ground level.

Power circuit 120 is connected to, and supplies power to, system controller 140 and, via internal switch 150, main system 130.

System controller 140 is also connected to internal switch 150 and controls turning the power to main system 130 on and off. System controller 140 is also connected to main system 130 and can send a reset signal to main system 130.

Figure 3:
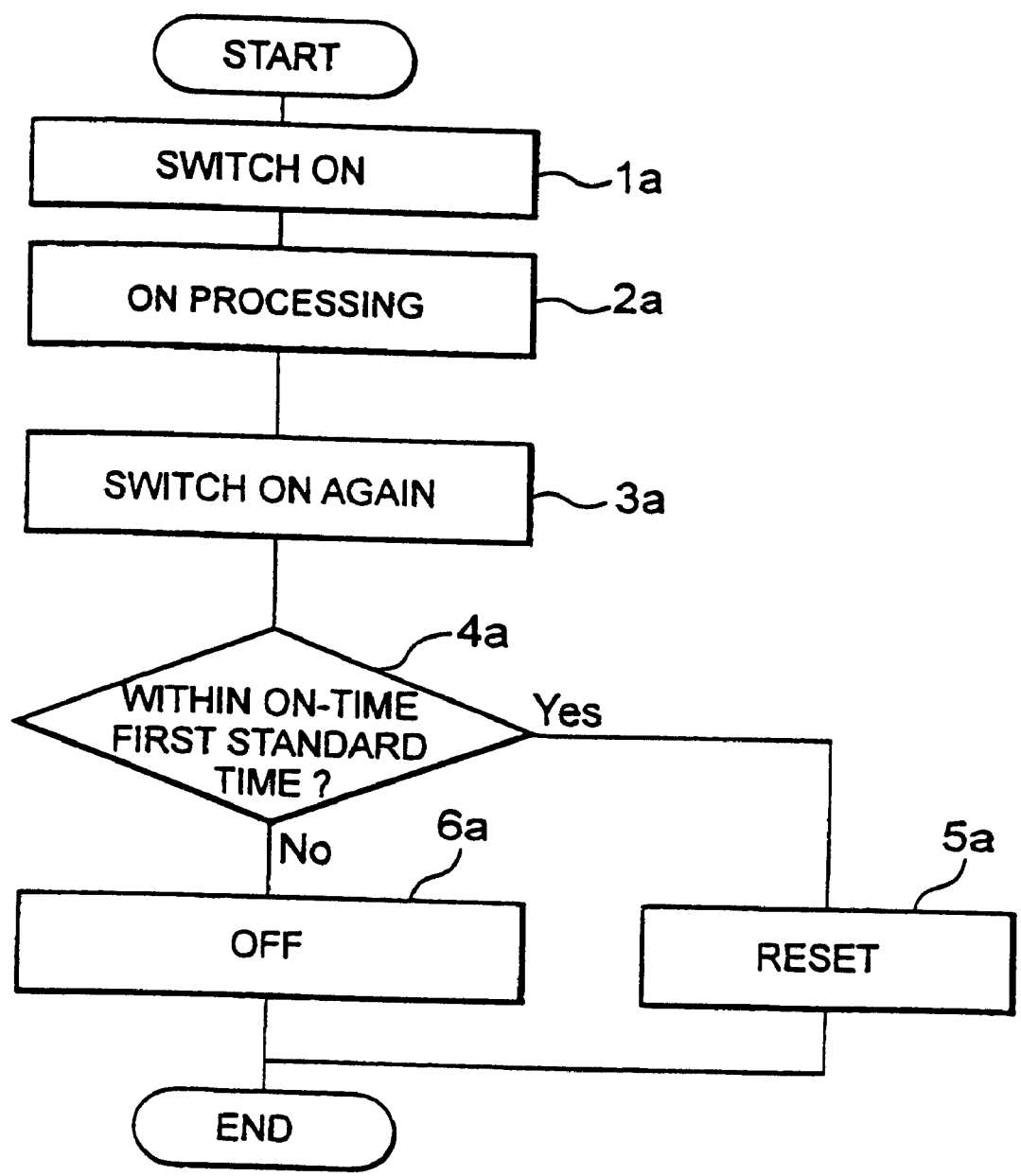
FIG. 3 is a flowchart showing an example of the power source control procedure.

Referring to FIG. 3, a first embodiment of the power control procedure will be described.

When push switch 114 is pressed while the power of main system 130 is off (step 1a), system controller 140 detects the signal, a power-on signal is output to internal switch 150 by power control unit 141 (step 2a), and power is supplied to main system 130.

When push switch 114 is pressed again while power is being supplied to main system 130 (step 3a), power control unit 141 measures the time during which switch 114 is being pressed. Then it is judged whether the time during which this switch 114 continues to be pressed is long or short (step 4a). While the time during which switch 114 is continuously pressed since the beginning of the measurement remains less than a first standard time, if switch 114 is released, a reset signal is transmitted to main system 130 (step 5a). If the time during which switch 114 is pressed, exceeds the predetermined first standard time, a power-off signal for main system 130 is sent to internal switch 150 (step 6a).

In this way, a single switch is given two functions: power on/off, and reset.

Figure 4:
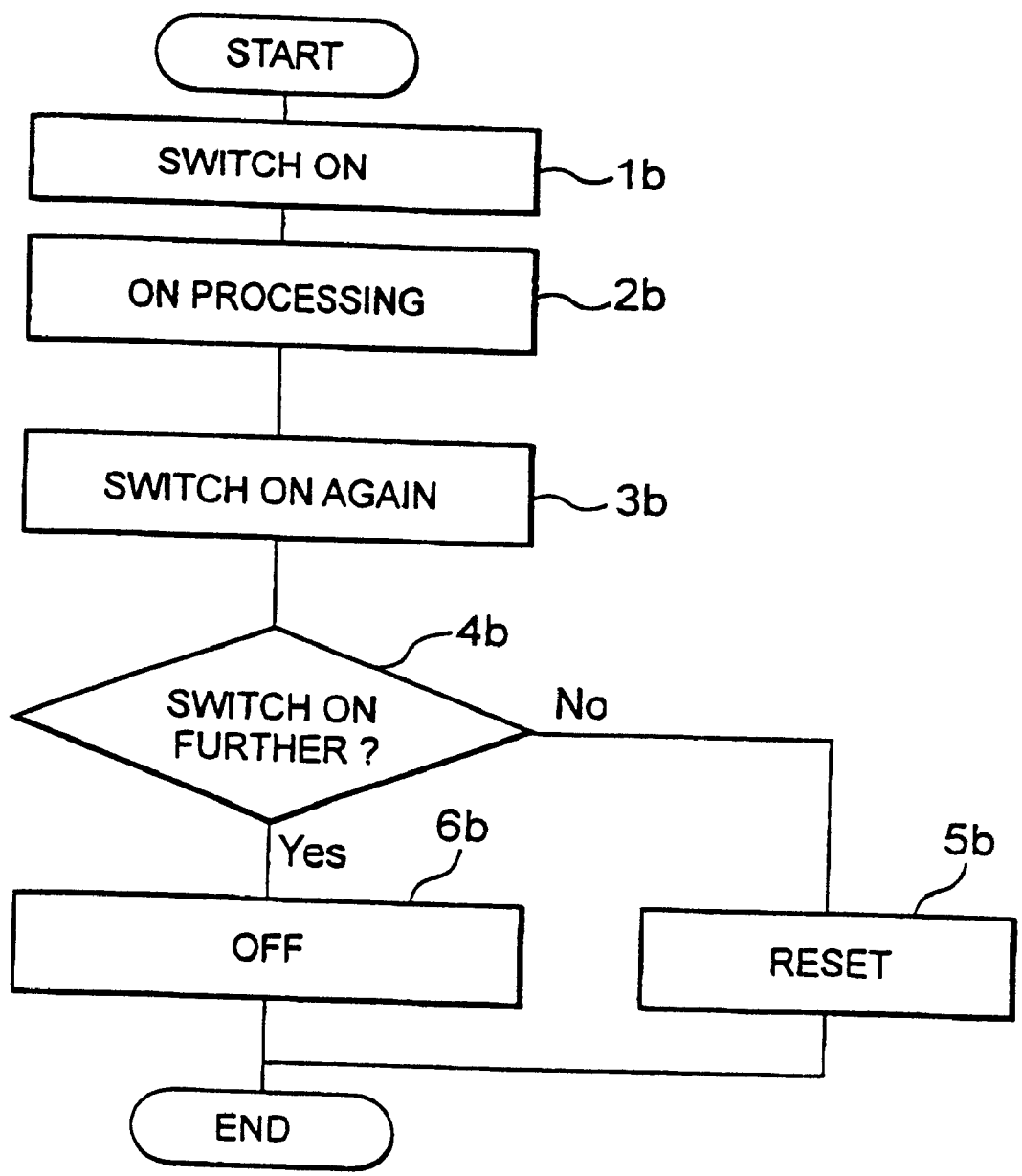
FIG. 4 is a flowchart showing another example of the power source control procedure.

In the above described embodiment, the decision between power-off and reset is made by the length of the time during which the push switch continues to be pressed, but this invention is not limited to this effect. For example, the decision may be made by the number of times the switch is pressed within a prescribed time period. Specifically, for example, the power on signal is output (step 2b) as a measurement of the time beginning (step 1b) when the switch is first pressed as shown in FIG. 4. After this, if the number of times it is pressed within the prescribed time period is once (step 3b), a reset may be done (steps 4b, 5b), and if that member is two, a power-off (steps 4b, 6b) may be done.

Also, if after reset there is no operation input to entertainment device 100 for a fixed period of time or longer, the power may be turned off. For example, the following may be done.

Figure 5:
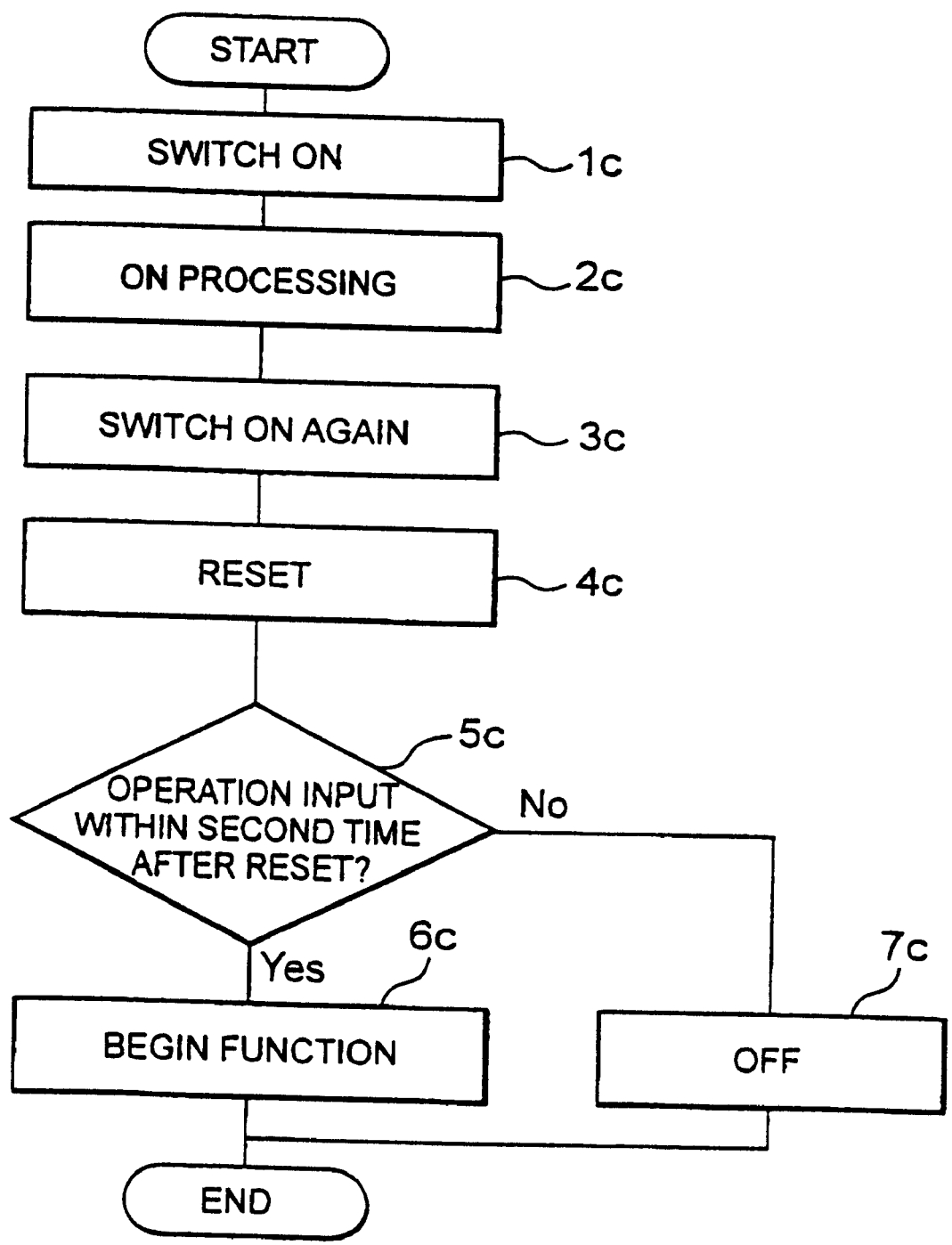
FIG. 5 is a flowchart showing still another example of the power source control procedure.

That is, in FIG. 5, the operation is the same from step 1c to step 3c as from step 1a to step 3a in FIG. 3, but if, after completion of the reset of main system 130 (step 4c), the user of entertainment device 100 makes some operation input to entertainment device 100 (step 5c), main system 130 reports the start of an entertainment function to power control unit 141 (step 6c). On the other hand, power control unit 141, after transmitting a reset signal, measures the elapsed time since when it was transmitted. And if no entertainment function start report is received from main system 130 even after a second standard time has elapsed, power control unit 141 transmits a power-off signal to internal switch 150 (step 7c). In this case, the power is turned off even if in step 4c the user intends to turn the power off but actually only did a reset, and the power is not turned off and is left as is.

Figure 6:
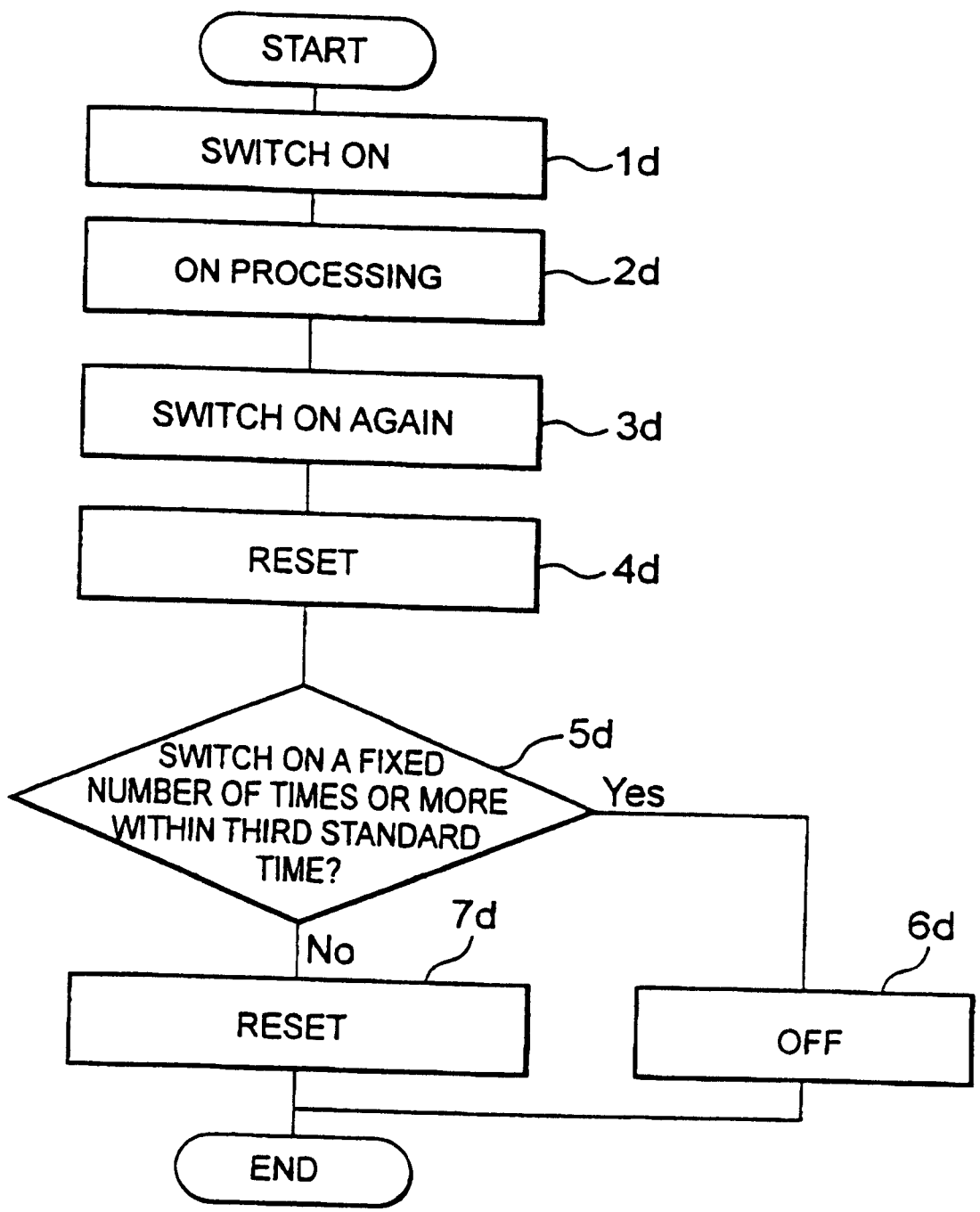
FIG. 6 is a flowchart showing yet another example of the power source control procedure.

Moreover, if switch 114 is repeatedly pressed, the power may be turned off if the number of times it is pressed within a fixed time period reaches a fixed number of times. This is because one can conceive of cases in which a user repeating the reset operation many times means that he is not familiar with how to use entertainment device 100, so although he wants to turn the power off, he cannot. That is, the operation steps 1d to 4d in FIG. 6 are the same as steps 1c to 4c in FIG. 5, but a power off signal is output to internal switch 150 (step 6d) if, after outputting a reset signal to main system 130 (step 4d), power control unit 141 outputs a reset signal a predetermined standard number of times or more within a third standard time (step 5d).

In the examples shown in FIG. 2 to FIG. 6 the sharing of the power switch and reset switch by push switch 114 has been described. In these embodiments, as an example of the sharing of multiple functions by a single switch, the two functions of turning the power off and resetting are shared by the push switch. In addition, rather than making a simple selection, etc. of the two functions, the two functions are controlled by providing a priority and conditions for the two functions under fixed conditions according to how the switch is operated. Therefore, in the examples of FIG. 2 to FIG. 6, various modification examples can be applied as necessary according to the priority and conditions of these functions.

Moreover, the object of this invention is to share multiple functions by a single switch and to control multiple functions by providing a priority and conditions for multiple functions under fixed conditions according to how a switch is operated, and application examples can exist concerning the type of switch, the number and types of functions, the priority and conditions for the functions, and many other modifications.

In this way the present invention makes it possible to provide an entertainment device that receives operation instructions of multiple kinds with the same operation unit.

What is claimed is:

1. An entertainment device comprising:
   a main system,
   an operation unit that receives operation instructions applied to said operation unit by a user from outside of the entertainment device; said operation unit further comprising a pushbutton and said operation instructions further comprising a single push of said pushbutton;
   a control unit that receives signals from said operation unit and controls an operation state of said main system; and
   a switch that decides whether to turn power supply to the main system on or off based on instructions from said control unit,
   wherein said control unit decides, when power is being supplied to said main system, based on a mode of said signal input by said operation unit, whether to output to said switch a signal instructing that the power supply be turned off, or whether to output to said main system a signal giving a reset instruction.

2. The entertainment device described in claim 1, wherein
   when said switch has been turned on based on a first operation of said operation unit, power is supplied to said main system; and
   said signal input by said operation unit is determined by counting a first standard time by a second operation continuation time of said operation unit.

3. The entertainment device as described in claim 1, wherein
   when said switch has been mined on based on a first operation of said operation unit, power is supplied to said main system; and
   said signal input by said operation unit is determined by the number of times of a second operation of said operation unit.

4. The entertainment device as described in claim 1, wherein
   when said switch has been turned on based on a first operation of said operation unit, power is supplied to said main system; and
   said signal input by said operation unit is determined by existence or absence of a second operation of said operation unit and of further operation input from outside in a second standard time following this second operation.

5. The entertainment device as described in claim 1, wherein
   when said switch has been turned on based on a first operation of said operation unit, power is supplied to said main system; and
   said signal input by said operation unit is determined by an initial second operation of said operation unit and a multiple number of times of the second operation in a third standard time following said second operation.

6. An entertainment device comprising:
   a main system,
   a push switch that receives operation instructions from outside; said operation instructions further comprising a single push of said push switch;
   a control unit that receives signals conveyed from said push switch and controls an operation state of said main system, and
   a power supply switch that decides whether to turn power supply to the main system on or off, based on instructions from said control unit, wherein
   when power is being supplied to said main system, said control unit decides,
   based on a mode of signal conveyed from said push switch, whether to output to said power supply switch a signal instructing that the power supply he turned off, or whether to output to said main system a signal giving a reset instruction.

7. The entertainment device as described in claim 6, wherein
   when power is supplied to said main system is when said power supply switch has been turned on based on a first operation of said push switch, and
   a decision of said control unit based on the mode of a signal conveyed from said push switch, whether to output to said power supply switch a signal instructing that the power supply be turned off, or whether to output to said main system a signal giving a reset instruction, is obtained
   if a continuation time of a second operation of said push switch is less than a first standard time, and as signal instructing that the power supply be turned off is output to said power supply switch, and if the continuation time of the second operation of said push switch is greater than or equal to a first standard time, a signal giving a reset instruction is output to said main system.

8. The entertainment device as described in claim 6, wherein
   when power is supplied to said main system is when said power supply switch has been turned on based on a first operation of said push switch a decision of said control unit,
   based on the mode of signal conveyed front said push switch, whether to output to said power supply switch a signal instructing that the power supply be turned off, or whether to output to said main system a signal giving a reset instruction is obtained
   if the number of times of a second operation of said push switch is one time, a signal giving a reset instruction is output to said main system, and if the number of times of the second operation of said push switch is two times, a signal instructing that the power supply be turned off is output to said power supply switch.

9. The entertainment device as described in claim 6, wherein
   when power is supplied to said main system is when said power supply switch has been turned on based on a first operation of said push switch a decision of said control unit,
   based on the mode of signal conveyed from said push switch, whether to output to said power supply switch a signal instructing that the power supply be turned off, or whether to output to said main system a signal giving a reset instruction is obtained
   by a second operation of said push switch and a signal giving a reset instruction is output to said main system, and if there is no operation input from outside within a second standard time after a second operation of said push switch, a signal instructing that the power supply be turned off is output to said power supply switch.

10. The entertainment device as described in claim 9, wherein
    if there is an operation input from outside within a second standard time after the second operation of said push switch, the entertainment function is begun.

11. The entertainment device as described in claim 6, wherein when power is supplied to said main system is when said power supply switch has been turned on based on a first operation of said push switch a decision of said control unit, based on the mode of signal conveyed from said push switch, whether to output to said power supply switch a signal instructing that the power supply be turned off, or whether to output to said main system a signal giving a reset instruction is obtained by a second operation of said push switch and a signal giving a reset instruction is output to said main system, and if there is an operation of said push switch the prescribed number of times or more within a third standard time after a second operation of said push switch, a signal instructing that the power supply be turned off is output to said power supply switch.

12. An operation method of an entertainment system including an operation unit, a control unit, a main system and a switch, the operation method composing the steps of:

operating the operation unit from outside of the entertainment system; said operation unit further comprising a pushbutton and said operating further comprising a single push of said pushbutton;

receiving signals from said operation unit and controlling by the control unit an operation state of the main system, and deciding whether to turn power supply to said main system on or off by the switch based on instructions from said control unit, wherein when power is being supplied to said main system by said switch being on, based on the state of said signal input by said operation unit, it is decided whether to output to said switch a signal instructing that the power supply be turned off, or whether to output to said main system a signal giving a reset instruction for the entertainment system.

13. The operation method as described in claim 12, wherein when power is being supplied to said main system by said switch being on is when said switch has been turned on based on a first operation of said operation unit, and a mode of said signal input by said operation unit is to count a first standard time by the continuous time of a second operation of said operation unit.

14. The operation method as described in claim 12, wherein when power is being supplied to said main system by said switch being on is when said switch has been turned on based on a first operation of said operation unit, and a mode of said signal input by said operation unit is to count the number of second operations of said operation unit.

15. The operation method as described in claim 12, wherein when power is being supplied to said main system by said switch being on is when said switch has been turned on based on a first operation of said operation unit, and a mode of said signal input by said operation unit is the existence or absence of a second operation of said operation unit and of further operation input from outside in a second standard time following the second operation.

16. The operation method as described in claim 12, wherein when power is being supplied to said main system by said switch being on is when said switch has been turned on based on a first operation of said operation unit, and a mode of said signal input by said operation unit is an initial second operation of said operation unit and a multiple number of times of the operation in a third standard time following this second operation.

17. In an operation method of an entertainment device including a push switch, a control unit, a main system, and a power supply switch, the operation method comprising the steps of:

operating said push switch from outside of the entertainment system with a single push of said push button, receiving signals conveyed from said push switch and controlling, by the control unit, an operation state of the main system and deciding whether to turn the power supply to said main system on or off by the power supply switch based on instructions from said control unit, wherein when power is being supplied to said main system by said power supply switch being on, based on the state of signals conveyed by said push switch, it is decided whether to output to said power supply switch a signal instructing that the power supply be turned off, or whether to output to said main system a signal giving a reset instruction to the entertainment system.

18. The operation method as described in claim 17, wherein when power is supplied to said main system by said power supply switch being turned on is when said power supply switch has been turned on based on a first operation of said push switch, deciding, based on the mode of signal conveyed from said push switch, whether to output to said power supply switch a signal instructing that the power supply he turned off, or whether to output to said main system a signal giving a reset instruction, is obtained if the continuation time of a second operation of said push switch is less than a first standard time, and a signal instructing that the power supply be turned off is output to said power supply switch, and if the continuation time of a second operation of said push switch is greater than or equal to a first standard time, a signal giving a reset instruction is output to said main system.

19. The operation method as described in claim 17, wherein when power is supplied to said main system by said power supply switch being turned on is when said power supply switch has been turned on based on a first operation of said push switch, deciding, based on the mode of signal conveyed from said push switch, whether to output to said power supply switch a signal instructing that the power supply be turned off, or whether to output to said main system a signal giving a reset instruction, is obtained if the number of times of a second operation of said push switch is one time, and a signal giving a reset instruction is output to said main system, and if the number of times of a second operation of said push switch is two times, a signal instructing that the power supply be turned off is output to said power supply switch.

20. The operation method as described in claim 17, wherein when power is supplied to said main system by said power supply switch being turned on is when said power supply switch has been turned on based on a first operation of said push switch, deciding, based on the mode of signal conveyed from said push switch, whether to output to said power supply switch a signal instructing that the power supply be turned off, or whether to output to said main system a signal giving a reset instruction, is obtained by a second operation of said push switch and a signal giving a reset instruction is output to said main system, and if there is no operation input from outside within a second standard time after a second operation of said push switch, a signal instructing that the power supply be turned off is output to said power supply switch.

21. The operation method as described in claim 20, wherein if there is an operation input outside within a second standard time after a second operation of said push switch, the entertainment function is begun.

22. The operation method as described in claim 17, wherein when power is supplied to said main system by said power supply switch being turned on is when said power supply switch has been turned on based on a first operation of said push switch, deciding, based on the mode of signal conveyed from said push switch, whether to output to said power supply switch a signal instructing that the power supply be turned off, or whether to output to said main system a signal giving a reset instruction, is obtained by a second operation of said push switch and a signal giving a reset instruction is output to said main system, and if there is an operation of said push switch the prescribed number of times or more within a third standard time after a second operation of said push switch, a signal instructing that the power supply be turned off is output to said power supply switch.

* * * * *

UNITED STATES PATENT AND TRADEMARK OFFICE
CERTIFICATE OF CORRECTION

PATENT NO.      : 6,621,182 B2
DATED           : September 16, 2003
INVENTOR(S)     : Toru Akazawa It is certified that error appears in the above-identified patent and that said Letters Patent is hereby corrected as shown below:

<u>Column 5,</u>
Line 5, replace claims as follows:

1. An entertainment device comprising:
   a main system,
   an operation unit that receives operation instructions applied to said operation unit by a user from outside of the entertainment device; said operation unit further comprising a single pushbutton and said operation instructions further comprising at least one single push of said single pushbutton;
   a control unit that receives signals from said operation unit and controls an operation state of said main system; and
   a switch that decides whether to turn power supply to the main system on or off based on instructions from said control unit,
   wherein said control unit decides, when power is being supplied to said main system, based on a duration of said signal input by said operation unit, between only whether to output to said switch a signal instructing that the power supply be turned off in accordance with a first duration of said signal input, or whether to output to said main system a signal giving a reset instruction in accordance with a second duration of said signal input, said first duration being longer than said second duration.
2. The entertainment device as described in claim 1, wherein
   when said switch has been turned on based on a first operation of said operation unit, power is supplied to said main system; and
   said signal input by said operation unit is determined by counting a first standard time by a second operation continuation time of said operation unit.
3. The entertainment device as described in claim 1, wherein
   when said switch has been turned on based on a first operation of said operation unit, power is supplied to said main system; and
   said signal input by said operation unit is determined by the number of times of a second operation of said operation unit during said first or second duration.
4. The entertainment device as described in claim 1, wherein
   when said switch has been turned on based on a first operation of said operation unit, power is supplied to said main system; and said signal input by said operation unit is determined by existence or absence of a second operation of said operation unit and of further operation input from outside in a second standard time following this second operation.
5. The entertainment device as described in claim 1, wherein
   when said switch has been turned on based on a first operation of said operation unit, power is supplied to said main system; and
   said signal input by said operation unit is determined by an initial second operation of said operation unit and a multiple number of times of the second operation during said first or second duration in a third standard time following said second operation.
6. An entertainment device comprising,
   a main system,
   a push switch that receives operation instructions from outside; said operation instructions further comprising at least one single push of said push switch;
   a control unit that receives signals conveyed from said push switch and controls an operation state of said main system, and
   a power supply switch that decides whether to turn power supply to the main system on or off, based on instructions from said control unit, wherein
     when power is being supplied to said main system,
     said control unit decides,
     based on a duration of the signal conveyed from said push switch, between only whether to output to said power supply switch a signal instructing that the power supply be turned off in accordance with a first duration, or whether to output to said main system a signal giving a reset instruction in accordance with a second duration, said first duration being longer than said second duration.

UNITED STATES PATENT AND TRADEMARK OFFICE
CERTIFICATE OF CORRECTION

PATENT NO.    : 6,621,182 B2
DATED         : September 16, 2003
INVENTOR(S)   : Toru Akazawa It is certified that error appears in the above-identified patent and that said Letters Patent is hereby corrected as shown below:

Column 5 (cont'd),

7. The entertainment device as described in claim 6, wherein
when power is supplied to said main system is when said power supply switch has been turned on based on a first operation of said push switch a decision of said control unit,
based on the mode of signal conveyed from said push switch, whether to output to said power supply switch a signal instructing that the power supply be turned off, or whether to output to said main system a signal giving a reset instruction is obtained if the number of times of a second operation of said push switch is one time during said second duration, a signal giving a reset instruction is output to said main system, and if the number of times of the second operation of said push switch is two times during said first duration, a signal instructing that the power supply be turned off is output to said power supply switch.

8. The entertainment device as described in claim 6, wherein
when power is supplied to said main system is when said power supply switch has been turned on based on a first operation of said push switch a decision of said control unit,
based on the mode of signal conveyed from said push switch, whether to output to said power supply switch a signal instructing that the power supply be turned off, or whether to output to said main system a signal giving a reset instruction is obtained
by a second operation of said push switch and a signal giving a reset instruction is output to said main system, and if there is no operation input from outside within a second standard time after a second operation of said push switch, a signal instructing that the power supply be turned off is output to said power supply switch.

9. The entertainment device as described in claim 6, wherein
when power is supplied to said main system is when said power supply switch has been turned on based on a first operation of said push switch a decision of said control unit,
based on the mode of signal conveyed from said push switch, whether to output to said power supply switch a signal instructing that the power supply be turned off, or whether to output to said main system a signal giving a reset instruction is obtained by a second operation of said push switch during said second duration and a signal giving a reset instruction is output to said main system,
and if there is an operation of said push switch a prescribed number of times or more within a said first duration after a second operation of said push switch, a signal instructing that the power supply be turned off is output to said power supply switch.

10. An operation method of an entertainment system including an operation unit, a control unit, a main system and a switch, the operation method comprising the steps of:
operating the operation unit from outside of the entertainment system; said operation unit further comprising a pushbutton and said operating further comprising at least one single push of said pushbutton;
receiving signals from said operation unit and controlling by the control unit an operation state of the main system, and deciding between only whether to turn power supply to said main system on or off by the switch based on instructions from said control unit or whether to give a reset instruction to said entertainment system, wherein
when power is being supplied to said main system by said switch being on,
based on the duration of said signal input by said operation unit, it is decided whether to output to said switch a signal instructing that the power supply be turned off in accordance with a first duration, or whether to output to said main system a signal giving a reset instruction for the entertainment system in accordance with a second duration, said first duration being longer than said second duration.

UNITED STATES PATENT AND TRADEMARK OFFICE
CERTIFICATE OF CORRECTION

PATENT NO. : 6,621,182 B2
DATED : September 16, 2003
INVENTOR(S) : Toru Akazawa

It is certified that error appears in the above-identified patent and that said Letters Patent is hereby corrected as shown below:

Column 5 (cont'd),

11. The operation method as described in claim 10, wherein
when power is being supplied to said main system by said switch being on is when said switch has been turned on based on a first operation of said operation unit, and
a mode of said signal input by said operation unit is to count a first standard time by the continuous time of a second operation of said operation unit.

12. The operation method as described in claim 10, wherein
when power is being supplied to said main system by said switch being on is when said switch has been turned on based on a first operation of said operation unit, and
a mode of said signal input by said operation unit is to count the number of second operations of said operation unit during said first or second duration.

13. The operation method as described in claim 10, wherein
when power is being supplied to said main system by said switch being on is when said switch has been turned on based on a first operation of said operation unit, and
a mode of said signal input by said operation unit is the existence or absence of a second operation of said operation unit and of further operation input from outside in a second standard time following the second operation.

14. The operation method as described in claim 10, wherein
when power is being supplied to said main system by said switch being on is when said switch has been turned on based on a first operation of said operation unit, and
a mode of said signal input by said operation unit during said first duration is an initial second operation of said operation unit and a multiple number of times of the operation in a third standard time following this second operation.

15. In an operation method of an entertainment device including a push switch, a control unit, a main system, and a power supply switch, the operation method comprising the steps of:
operating said push switch from outside of the entertainment system with at least one single push of said push button,
receiving signals conveyed from said push switch and controlling, by the control unit, an operation state of the main system and
deciding between only whether to turn the power supply to said main system on or off by the power supply switch based on instructions from said control unit or whether to give a reset instruction to said entertainment device,
wherein when power is being supplied to said main system by said power supply switch being on, based on the duration of signals conveyed by said push switch, it is decided whether to output to said power supply switch a signal instructing that the power supply be turned off in accordance with a first duration, or whether to output to said main system a signal giving a reset instruction to the entertainment system in accordance with a second duration, said first duration being longer than said second duration.

16. The operation method as described in claim 15, wherein
when power is supplied to said main system by said power supply switch being turned on is when said power supply switch has been turned on based on a first operation of said push switch,
deciding, based on the mode of signal conveyed from said push switch, whether to output to said power supply switch a signal instructing that the power supply be turned off, or whether to output to said main system a signal giving a reset instruction, is obtained if the number of times of a second operation of said push switch is one time during said second duration, a signal giving a reset instruction is output to said main system, and if the number of times of a second operation of said push switch is two times during said first duration, a signal instructing that the power supply be turned off is output to said power supply switch.

UNITED STATES PATENT AND TRADEMARK OFFICE
CERTIFICATE OF CORRECTION

PATENT NO. : 6,621,182 B2
DATED : September 16, 2003
INVENTOR(S) : Toru Akazawa

It is certified that error appears in the above-identified patent and that said Letters Patent is hereby corrected as shown below:

<u>Column 5 (cont'd),</u>

17. The operation method as described in claim 15, wherein
when power is supplied to said main system by said power supply switch being turned on is when said power supply switch has been turned on based on a first operation of said push switch,
deciding, based on the mode of signal conveyed from said push switch, whether to output to said power supply switch a signal instructing that the power supply be turned off, or whether to output to said main system a signal giving a reset instruction, is obtained
by a second operation of said push switch and a signal giving a reset instruction is output to said main system, and if there is no operation input from outside within a second standard time after a second operation of said push switch, a signal instructing that the power supply be turned off is output to said power supply switch.

18. The operation method as described in claim 15, wherein
when power is supplied to said main system by said power supply switch being turned on is when said power supply switch has been turned on based on a first operation of said push switch,
deciding, based on the mode of signal conveyed from said push switch, whether to output to said power supply switch a signal instructing that the power supply be turned off, or whether to output to said main system a signal giving a reset instruction, is obtained by a second operation of said push switch during said second duration and a signal giving a reset instruction is output to said main system, and if there is an operation of said push switch a prescribed number of times or more within a third standard time after a second operation of said push switch and during said first duration, a signal instructing that the power supply be turned off is output to said power supply switch.

Signed and Sealed this

Twenty-seventh Day of July, 2004

JON W. DUDAS
*Acting Director of the United States Patent and Trademark Office*